Figure 1:
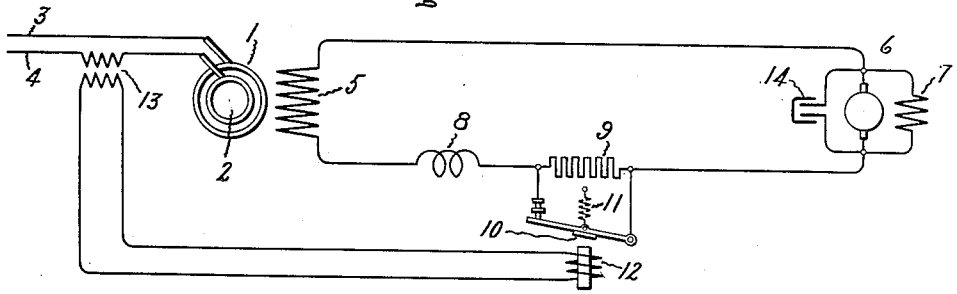

E. E. F. CREIGHTON.
ELECTRIC PROTECTIVE DEVICE.
APPLICATION FILED NOV. 10, 1914.

1,287,244.

Patented Dec. 10, 1918.
2 SHEETS—SHEET 1.

Witnesses:

Inventor:
Elmer E. F. Creighton,
by
His Attorney

E. E. F. CREIGHTON.
ELECTRIC PROTECTIVE DEVICE.
APPLICATION FILED NOV. 10, 1914.
1,287,244.
Patented Dec. 10, 1918.
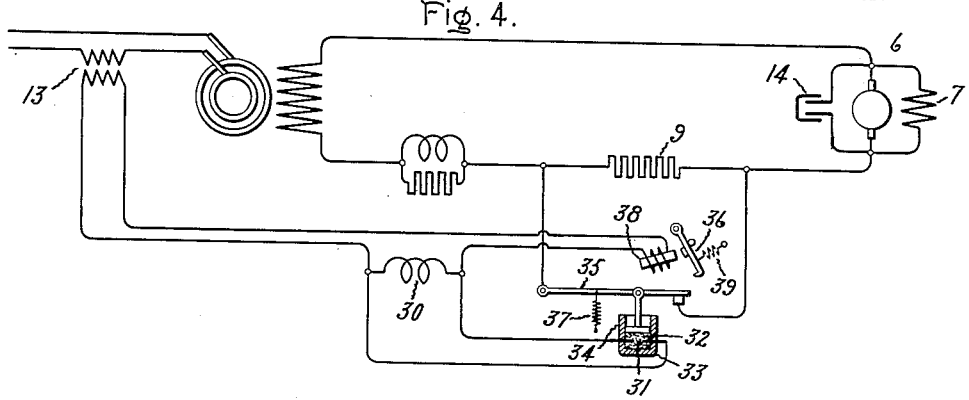
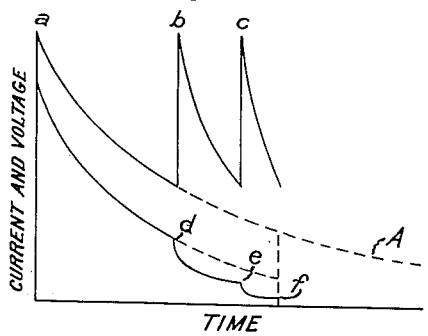
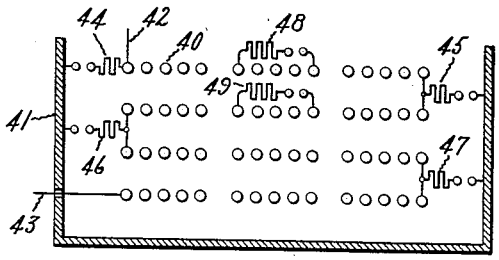
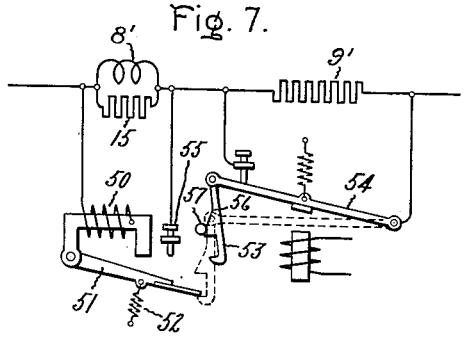
Inventor:
Elmer E. F. Creighton,

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

ELECTRIC PROTECTIVE DEVICE.

1,287,244.      Specification of Letters Patent.      Patented Dec. 10, 1918.

Application filed November 10, 1914. Serial No. 871,385.

*To all whom it may concern:*

Be it known that I, ELMER E. F. CREIGHTON, a citizen of the United States, residing at Schenectady, county of Schenectady, State of New York, have invented certain new and useful Improvements in Electric Protective Devices, of which the following is a specification.

My invention relates to electric protective devices and is especially adapted for the protection of electric generators supplying transmission lines, the exciters, and the transmission lines themselves, from the injurious effects of heavy currents or other surges which may be set up in such lines and circuits.

Accidental short-circuits, grounds and other abnormal conditions frequently occur on transmission lines, setting up upon such lines heavy current and high voltage surges. The effects of these surges on the lines and the armature circuits of the generators and exciters are usually not relieved initially by the circuit breakers or other devices which are commonly used to open the generator circuits. In fact, it is common practice to delay the opening of the circuit breakers for a brief time, measured in seconds or fractions thereof, in order that the heavy surges in the generator and exciter circuits may have time to die down. This precaution is taken to save the circuit breakers from damage in attempting to open the circuit during the period the surges are the heaviest. It has also been found that when current surges occur upon such lines, these surges passing through the generator armatures, aided by internal reaction, may induce high voltage surges in the circuits comprising the field windings and the exciters of the generators, and thus injure the same. Also voltage regulators are frequently used to maintain a substantially constant voltage on an electric circuit, and when such a circuit is subject to an arcing ground or short-circuit, the regulator tends to keep the voltage of the circuit constant and thus to maintain a large and injurious flow of current on the transmission lines through the generator armature circuits and through the generator field windings and circuits.

When a short-circuit takes place on a transmission line, the inductance in the circuit predominates and causes the current in the circuit to lag nearly 90 degrees behind the electromotive force induced in the armature of the generator. This lagging current occurs at a time when a pole of the field is passing in front of the armature coil in which the lagging current is passing. As a result, the current in the armature tends to demagnetize the field cores. Since under short-circuit conditions the ampere turns in the armature coils become very high, the demagnetizing effect is proportionally strong on the field cores. This will decrease the magnetism in the cores and in so doing induce an electromotive force in the field coils or winding. The exciter circuit then will have induced in it a high voltage of an alternating nature. In general it may be stated that whenever an attempt is made to reduce the flux which threads the coil, an electromotive force is induced in the coil in such a direction as to tend to maintain the flux.

From another standpoint, the electromagnetism in the field coil is energy. It is necessary to absorb this energy before the field flux can disappear. The desire is to reduce the field flux to a low value in the shortest possible time so that the arc on the circuit may be extinguished by new conditions or perhaps so that the oil switches usually employed for this purpose may open the circuit successfully and at the same time so that any synchronous apparatus connected to the transmission lines will not drop out of step. To attempt to destroy the magnetic field in the generator field instantly would induce an electromotive force in the field winding so high that it would puncture and permanently damage the insulation.

The object of my invention is to prevent the injurious effects which I have described by reason of the presence of abnormal conditions on the transmission lines and in the generator armature circuits. I accomplish this object by inserting devices either in parallel or series in the circuit of the exciter or field winding which absorb the energy both stored in this circuit and transmitted to it. In the accompanying figures I have shown diagrammatically devices to take care of the alternating current conditions and produce the most rapid logarithmic decay of the energy in the field coils that it is possible to effect without causing destruction to vital parts of the generator and exciter.

In its broader aspect my invention may be applied to any electromagnet. While I have described it for convenience as applied to an electric generator, it will be understood that with modifications, such as are well known to those skilled in the art, it may be applied to electromagnets, transformers and the like.

I am aware that various suggestions have been proposed to lower the line current when regulators employed for the purpose of keeping constant voltages upon circuits are operating under conditions of short-circuit, and one of those with which I am familiar is that shown by British Patent No. 1509 of 1909. The principles, however, underlying this and other suggestions with which I am familiar are based upon an effort to prevent excessive voltage or current flow during the continuance of a short-circuit. Their object is not to minimize the effect of instantaneous surges. My invention differs then from these suggestions in that its fundamental idea is to prevent or limit the injurious effects of such surges.

Figure 2:
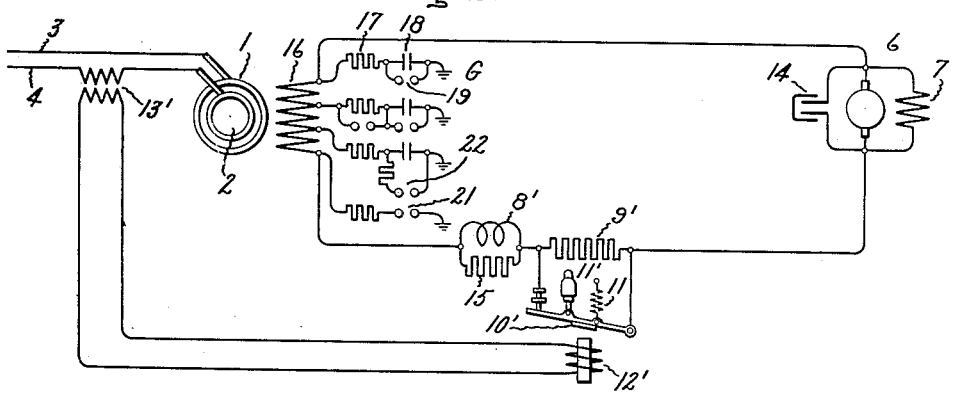
Figure 3:
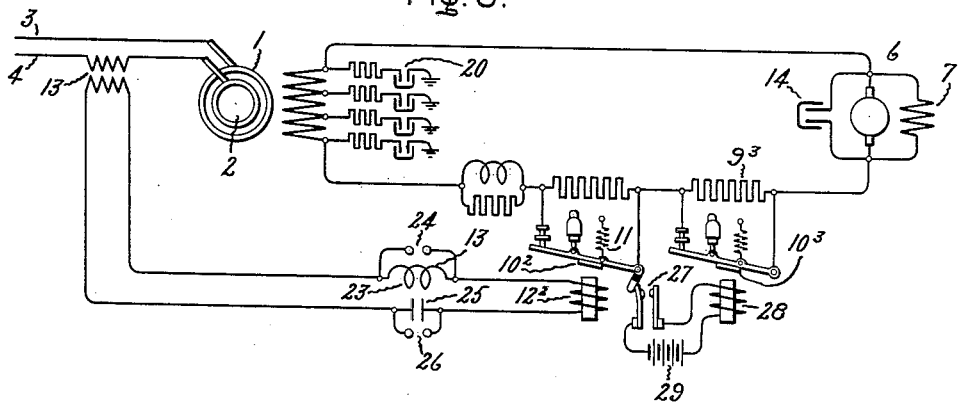

For a further understanding of my invention, reference may be had to the accompanying drawings in which Figure 1 shows diagrammatically certain features of my invention as applied to a single phase system; Fig. 2 shows diagrammatically a preferred form of my invention; Figs. 3 and 4 show modifications of the same; Fig. 5 is a curve illustrating the principle upon which my invention operates; Fig. 6 shows diagrammatically a portion of a field coil, and Fig. 7 shows a modification of a portion of my invention.

Referring first to Fig. 1, which broadly illustrates certain effects obtained by my invention, 1 is a generator which is diagrammatically shown for simplicity as a single phase alternating current generator having an armature circuit 2, the armature conductors not being shown, supplying conductors 3 and 4 of a transmission line. It will be understood that these conductors may supply the usual translating devices which have not been illustrated. The generator is shown as having a field winding 5 connected to the exciter 6 having its exciting field 7. It will be understood that this exciter may be of any of the usual types and that while no control resistance has been illustrated as connected in series with the exciter field winding, such resistance, if desired, may be employed. It will also be understood that the usual switches, circuit breakers, meters, etc., used with such systems, and which I have not illustrated may be employed.

Connected in series with the exciter circuit is a reactance 8 and a resistance 9. The resistance 9 is short-circuited by a conducting member 10 normally held in the short-circuiting position as shown by the spring 11. In operative relation with this conductive member 10, which may have a magnetic armature as shown, is an electromagnet 12 whose windings are energized by the secondary winding of the transformer 13, whose primary winding is connected in series with the conductor 4. A by-pass protector or electric valve, such as an aluminum cell or electrolytic valve 14, is shown as connected in parallel with the exciter.

The armature and field of the exciter have a considerable inductance due to their windings. Reactance 8 is of relatively high inductance compared to its resistance, and when alternating currents are induced in the field circuit, it absorbs the induced voltage and tends to prevent a variation in current. The by-pass protector 14 allows current of excess voltage to by-pass the exciter and thus prevents a destructive voltage increase at the exciter terminals.

Under normal conditions of full load on the generator the force exerted by the electromagnet 12 is not sufficient to draw down the armature of contact member 10 and thus open the short-circuit about resistance 9. Under short-circuit conditions, however, or abnormal conditions on the generator armature circuit, the current induced in the secondary of the transformer 13 will energize the winding of electromagnet 12 with sufficient force to cause a rapid downward movement of the contact member 10, and thus open the short-circuit about resistance 9. The resistance 9 is then thrown in series with the field winding of the generator, which action decreases the average field flux in the generator. If the resistance 9 is made very great, the change in current in the field winding is so sudden that the induced voltage across the field winding 5 will be so great as to cause destruction of the insulation. However, the greater the amount of resistance, the more rapidly will the field flux be reduced in the generator field. Therefore, the demand for auxiliary devices which will permit the introduction of a very high resistance without causing damage to the insulation is desirable. Furthermore the winding of electromagnet 12 and the armature and contact member 10 are mechanical devices having inertia and, therefore, require a period of time to move the contact member from its normally closed position wherein its short-circuits resistance 9 to its temporarily open position. Although this time may be very brief, it is very important and valuable since it requires such a brief period of time, of the order of a millionth of a second, to cause a puncture of the insulation. It is desirable, therefore, to use additional devices to operate during the brief interval counting from the beginning of the short-circuit to the time when the contact member 10 is drawn away from the contact.

Referring now to Fig. 2, which shows diagrammatically the arrangement which I prefer to use, in parallel with reactance 8' is connected a resistance 15. Whenever the exciting current tends to increase or decrease in the reactance 8', due to the abnormal conditions in the transmission line or the armature circuit, the reactance coil automatically introduces an opposing electromotive force and this shunts the surge set up in the exciting winding by such abnormal conditions to the resistance 15 where it is absorbed. Under normal conditions of direct current excitation, the reactance coil 8' offers no counter-electromotive force and, therefore, affects in no way the normal operation of the system. It is only when the reaction of the generator armature reduces the field that the reactance coil 8' and resistance 15 are called instantly into action. Under certain conditions it may be desirable to eliminate or short-circuit the reactance coil 8' and the resistance 15, and an arrangement for effecting this has been described in the latter portion of this specification with special reference to Fig. 7. For the sake of clearness this arrangement is not described or illustrated in connection with this figure.

In this figure the generator field winding is shown as being subdivided into three portions, although any desired number of portions for subdivision may be employed. In actual practice this field winding or the generator field coils are or may be subdivided into a greater number of portions, but a subdivision into three portions only has been shown as sufficient to illustrate the principles of my invention.

Each portion has connected in parallel to it what may be termed auxiliary circuits comprising in general resistances connected to spark gaps and condensers. These auxiliary circuits are shown as embracing various different arrangements of the resistances, spark gaps, etc., as will be explained later, but it is obvious that as many and various arrangements as desired may be employed and that the various arrangements illustrated have been shown merely for the purposes of illustration and of explanation of my invention.

In the various auxiliary circuits as shown a resistance 17 is connected in series with a condenser 18 and connected to ground G. In the arrangement shown at the top of the figure the condenser 18 has connected in parallel to it a spark gap 19 or other electric valve device to limit the voltage, as, for example, an aluminum or electrolytic cell such as is shown at 20, Fig. 3.

The object of these auxiliary circuits is to reduce the voltage strain upon the insulation of the field winding, and the following illustration may be used as showing the advantage to be so gained, especially by the subdivision of the field winding. Let it be assumed that the insulation strength from the field winding as shown to ground is 9000 volts safe potential. If an electrostatic force is induced in the three portions of the field winding shown connected in series, each portion may have induced in it only 3000 volts without causing a destructive strain on the insulation of the end wires of the field winding. If now, as shown in Fig. 2, each one of the portions is arranged to have a resistance and a safety gap to ground, the voltage may be three times as great without causing damage to the insulation. Using a resistance three times as great through which the energy of the portions of the field winding may discharge allows a decrease in the time of discharge to one-third. In practice generators frequently have a dozen or more poles, and it will be seen that with such generators the rate of destruction of the generator field may be carried on twelve times as fast with the devices 17, 18 and 19 as could be done by simply using the external series resistances 15 and 9'. It must, however, be considered that practical engineering conditions will sometimes favor one method more than another and will usually call for a combination of both simultaneously. It should be noted that it is not necessary to limit the number of devices represented by 17, 18 and 19 to the entire field winding or field spool, but these devices may be tapped in and subdivide a field spool into several parts, thus making it possible to transform the energy of the generator field into heat and dissipate it in an extremely short time as compared to present conditions. That this novel idea is valuable can be illustrated in a number of conditions, one of which is the fact that synchronous apparatus connected to the transmission line requires a definite time to drop out of step, and if the time element can be made less than this critical value for the synchronous apparatus, it is possible to keep the apparatus in step. Furthermore, all rotating apparatus, such as motors, have stored up in their rotating parts a considerable amount of dynamic energy which may be called on momentarily to supply power during a very brief period of trouble on the line.

The theory of operation of the device represented by the parts 17, 18 and 19 is as follows. Due to the reaction of the armature 2 and the current reducing effect of resistance 15 and resistance 9', the electromotive force across the several parts of the field winding 16 will be raised from a relatively low value to a very high value. This will cause a current to flow through the resistance 17 and in so doing there will be absorbed part of the electromagnetic energy. The resistance is made great enough so that it will raise the winding to the maximum safe potential on its insulation from wire to ground. The current which passes through resistance 17 will charge the condenser 18 and in so doing a part of the electromagnetic energy of the field winding will also be absorbed. When the potential of the condenser reaches the spark value of the gap 19, the gap will discharge the stored electrostatic energy in condenser 18 and will thus dissipate the energy in heat. In certain cases it is possible for the sake of simplicity to use a gap and resistance in series as shown in 21 of Fig. 2. Also it may be desirable to place a relatively small resistance in series with the gap 19 so as to hasten the destruction of the stored electrostatic energy. This is shown at 22, Fig. 2.

The operation of my device, as illustrated so far, gives the following effects: At the first instance of a short circuit on the transmission line, the current immediately shifts in phase to an approximately 90 degree lagging current and the armature reaction of 2 diminishes the field strength of the field 16, thus making the field winding a source of energy causing an electromotive force in the exciter circuit in the same direction as that generated by the exciter 6, and it thus tends to suddenly raise the current in the excitation circuit. The sudden increase is instantly opposed by reactance 8' which causes the current to flow through resistance 15. The introduction of resistance 15 raises the potential of the field winding 16 and causes each of its portions or the field coils to rise to its maximum spark potential above ground. The auxiliary circuit represented by 21 may also be used to aid in this adjustment. The energy of the field then is rapidly decreased and the voltage decreases correspondingly along the logarithmic curve.

It is well known that the rate of decrease on the logarithmic curve becomes very much less as time goes on. Therefore, it is desirable to introduce a new condition which will again hasten the discharge of the field. This new condition exists in the combination, as shown in Fig. 2, of the current transformer 13 and the devices—resistance 9', contact member 10' and electromagnet 12'. The resistance 9' is thrown in series with the excitation circuit and thus causes a sudden decrease in the excitation current. This sudden decrease again raises the induced potential in the field winding 16 and again brings the discharge rate through the absorbing circuit 17, 18 and 19 up to the maximum permissible value.

Following out this same method for the absorption of energy, another successively operated set of devices similar to 9', 10' and 12' automatically throwing in additional resistance might be used also in series with the excitation circuit to still further hasten the destruction of the field. This method can be continued by subdivisions until the field is reduced as rapidly as desired to as low a value as is wished for.

The conditions of the logarithmic discharge are represented approximately in Fig. 5. The first three peaks $a$, $b$, $c$ represent the voltage rise across the spark gaps of the field connections to ground. A corresponding decrease in current is roughly represented by $d$, $e$, $f$. The dotted part of the curve marked "A" shows the undisturbed logarithmic decrease of the potential. Lamination of the field cores also is a necessary condition to get a rapid reduction of the electro-magnetic field but does not affect the operation of the devices described.

It should be noted that the device consisting of members 9', 10', 11' and 12' can be made automatic in its operation by the proper adjustment of the spring 11 and the electromagnetic pull between the armature 10' and the electromagnet 12'. By such an adjustment 10' is held open only during the time of heavy short-circuit. When the short-circuit disappears then the spring 11 is sufficiently strong to throw the armature and its switch arm 10' back into its original position, thus short-circuiting the series resistance 9'. This automatic arrangement limits the presence of resistance in the excitation circuit to that brief period of time that the short-circuit exists. A dashpot 11' or other similar device may be used if desired to delay the opening of the short-circuit. It is evident that where several resistances are successively introduced into the excitation circuit there will be needed successive time elements on each one so that it will be introduced at the proper time. The use of successive time elements for the operation of switch devices is so old in the art that it seems unnecessary to describe them here. There are a number of well known arrangements, both mechanical and electrical, of timing the closing of any device to any desired value. One such arrangement for introducing resistances successively is shown in Fig. 3 where contact member $10^2$ in its downward movement closes contacts 27, causing electromagnet 28 to be energized by battery 29 and cause contact member $10^3$ to open the short-circuit about resistance $9^2$.

Fig. 3 also shows a modification of the connections employed in Figs. 1 and 2. A device introducing a time element that can also be used for another purpose is shown connected to the secondary winding of the series transformer 13. It is assumed in this case that only a limited amount of energy is available in transformer 13 and that it is desirable to conserve the energy from each half cycle and sum it up in the winding of the electromagnet 12². This is done by connecting reactance 23 in series with the energizing circuit of the winding for electromagnet 12², this reactance being shunted by the gap 24 and connecting also in series with the circuit condenser 25 shunted by gap 26. Reactance 23 and the winding of the electromagnet 12² are made resonant with the condenser 26 at generator frequency. The gaps 24 and 26 are used in this case to limit the maximum potential rise across reactance 23 and condenser 25.

In this figure also is shown the use of the aluminum cell or electrolytic valve 20 to replace the safety valve action of the auxiliary circuit devices shown in Fig. 2. An electric valve of this nature holds back the normal potential which is usually of the order of a hundred volts and thus allows no current to flow under normal conditions. However, when the voltage rises, due to the rapid destruction of the magnetic field of the generator, the electric valves open up and the excess voltage forces current through the resistance and the electric valves to earth in a number of multiple paths as shown.

It will be obvious that in automatic devices requiring mechanical motion the inertia of the moving parts of such devices causes a certain time delay. The arrangement shown in Fig. 4 may under such conditions be employed. Inductance 30 is connected in series with the secondary winding of transformer 13 and in shunt to this winding is connected a gap 31. This gap is shown as surrounded by an explosive, such as gunpowder 32 contained in a cylinder 33. Movable within the cylinder 33 and actuated by the force of the explosion of the explosive is a piston 34 in operative relation with the contact member 35, which, in its normal position, as shown, short-circuits the resistance 9 connected in series with the exciting winding of the generator. Under conditions of heavy current discharge or of abnormal conditions in the transmission line or the armature circuit of the generator, the potential across the terminals of the inductance 30 is increased, thus causing a spark to pass across the gap 31 and ignite the explosive contained in the cylinder 33. When such explosion occurs, the piston 34 will be moved upward, thus opening the short-circuit about the resistance 9. Contact member 35 will be held in its open circuit position by the latch 36 in a manner to be explained later. It will normally be held in the closed circuit position by the action of the spring 37.

The latch 36 is in operative relation with electromagnet 38 whose winding is energized through the secondary winding of transformer 13, whose primary winding is connected in series with one of the conductors of the transmission circuit. A suitable armature may be attached to the latch which will normally be held in the position shown in the drawing by spring 39. Under conditions of heavy current flow in the secondary of the transformer exciting circuit, the latch 36 will be held in the downward position and will thus keep the contact member 35 in its open circuit position. As soon, however, as the short-circuit or the heavy current condition disappears, the spring 39 will pull the latch into the position shown and release contact member 35 so it will move to the position shown in the figure, short-circuiting the resistance 9. In order to make this device automatic, an automatic arrangement may be used for introducing a cartridge of an explosive similar to that used in an ordinary gun. Such an arrangement is old and well known and it is believed that it is unnecessary to describe it.

As stated above, one of the objects of my invention is to protect the insulation used with the field windings or field coils of the generator from the effect of excessive voltage which may be set up in the windings from surges or abnormal conditions occurring in the transmission line or armature circuit of the generator.

As is well known, the exciting field windings commonly employed are usually arranged in field coils or wound upon a number of spools which surround the different poles of the generator. A different degree of insulation is used in the different parts of these spools. For example, with coils as usually wound in a number of turns forming a series of layers, there is used a certain amount of insulation between the turns, which insulation in general has a very high factor of safety. There is also used a certain amount of insulation between the several layers, which insulation has normally a lesser factor of safety than that employed for the insulation between the separate turns. A certain amount of insulation is also used between the outside turns of the layers which have to be separated from ground, and this insulation frequently has a still less factor of safety. In striving to absorb the maximum permissible energy from a field coil or coils without overstraining the insulation, the points of connection to the coils for the auxiliary circuits may be judiciously chosen to give superior effects to a simple and blind choice of connection points. For example, on any layer the shunting resistance may be chosen to give the maximum permissible summation of potentials between turns, provided, of course, this does not overstrain the insulation between layers. The taps between layers can be so chosen that the resistance between layers will give the maximum permissible electromotive force, caution being taken that this electromotive force does not exist between end turns and ground. Again, the entire winding of the field spools may be divided up into parts consisting of taps between separate layers and ground so that the voltage of no end wire will be able to jump either to ground or to any layer and thus puncture the insulation. Frequently the field coils are subdivided internally by radial insulating strips without introducing a ground potential. The coils may then be divided in such a way as to permit of local absorption by energy in the turns or layers.

By my invention the conditions which I have described may be carefully considered and provided against and it becomes possible to design the insulation which I have described and the absorbing devices to coöperate in such a way as to give a high subdivision of the field coils controlled in subdivided units by the natural conditions of the windings and absorbing devices. The insulation and absorbing devices are arranged to act together in such a way as not to overstrain the insulation.

Fig. 6 illustrates diagrammatically one of these conditions for a subdivided coil. The coil is shown as consisting of a plurality of conductors 40 which may be insulated and are wound in a number of turns forming layers on the spool 41. The illustration shows a cross-section of half a field coil merely for the purpose of illustration and as such field coils and such windings are well known, I have only illustrated the same in the simplest possible manner. Extending through the layers and at right angles to them are shown two air gaps or ducts for the purpose of ventilation. The winding of the spool as shown is connected to the outer terminal 42 and the inner terminal 43. Several layers are shown connected to the spool 41 or ground by means of auxiliary circuits or absorbing devices 44, 45, 46 and 47. Absorbing devices 48 and 49 show a local connection on parts of a layer where the insulation for the conductors forming such parts is not adjacent to the spool or to ground. It is obvious that all of the absorbing devices or only a portion of them as shown may be used.

In considering certain of the aspects of my invention, only the rate of decrease of magnetic flux in the generator field has so far been considered. However, after the accidental conditions or abnormal conditions on the transmission line or the armature circuit of the generator setting up surges in the exciting field winding have been removed by one method or another, it is desirable to restore the field flux as quickly as possible to its normal operating value, as will be obvious. Referring now to Fig. 2, it will be seen that the combination of the reactance 8' and resistance 15 becomes a hindrance to the rapid reestablishment of the field flux by preventing the application of the full potential of the exciter to the field winding.

It is, therefore, desirable to eliminate or cut out of the circuit this reactance and resistance when the field is being restored after an accidental short-circuit or other abnormal condition occurring on the transmission line.

A method of doing this is shown in Fig. 7, which shows only a portion of the generator exciting winding circuit. The reactance 8' and resistance 15 are shown as shunted by an open circuited voltage or holding coil 50. The holding coil 50 excites a magnetic core having an armature 51 which is movable and normally held in the open circuit position as shown by the spring 52. The holding coil and the spring are so interrelated that the armature 51 can never be closed by magnetic pull of the coil 50 against the tension of spring 52 but can be held in place, short-circuiting the resistance 15 and reactance 8' after closure by other means.

One form of such other means is shown to the right of the holding coil where a latch 53 is connected to the lever arm 54, this being substantially the same as the contact member or lever arm 10' shown in Fig. 2, and short-circuiting resistance 9'. When the lever arm 54 is open during an accidental short-circuit or abnormal condition on the transmission line or the armature circuit, the latch 53 drops down into the dotted line position and draws up arm 51 in the manner shown in the drawing. When the short-circuit is relieved, the arm 54 is drawn back to its normal position. The latch 53 lifts arm 51 into contact with contact member 55, thus closing the short-circuit around reactance 8' and resistance 15. Latch 53 in being raised up has its cam surface 56 drawn up along pin 57 in such a way that the latch releases arm 51 when it rises in contact with 55. Arm 51 is then held in contact with 55 as long as there is any appreciable drop of potential across the terminals or resistance 15. Reactance 8' and resistance 15 are thus short-circuited and the excitation of the field winding of the generator is restored as rapidly as possible. When, however, the field current becomes fairly constant, the reactance 8' gives an equivalent of a short-circuit on the resistance 15 and the voltage across the terminals of holding coil 50 becomes so diminished that it is no longer possible for it to hold an armature 51 in place and the armature is, therefore, drawn down by the action of spring 52 opening the short-circuit around reactance 8' and resistance 15 and placing them in their former relations to the excitation circuit.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In combination, a dynamo electric machine having armature and field circuits, and a plurality of independent means operative in response to abnormal conditions in a certain sequence to absorb the energy stored in said field circuit and transmitted thereto.

2. In combination, a dynamo electric machine having armature and field circuits, and a plurality of means connected to the field circuit and successively operative to absorb the energy stored in said circuit and transmitted thereto by abnormal conditions occurring in the armature circuit.

3. In combination, a dynamo electric machine having armature and field circuits, energy absorbing means for said field circuit normally inoperative but rendered operative in response to abnormal conditions in said armature circuit, and a second means operative to absorb the energy of said field circuit prior to the operation of said first mentioned means.

4. In combination, a dynamo electric machine having armature and field circuits, of means normally inoperative but operative in response to abnormal conditions on said armature circuit to dissipate the energy of said field circuit and of surges transmitted thereto, and other means subsequently operative in response to said abnormal conditions to further dissipate the energy of said field circuit.

5. In combination, a dynamo electric machine having armature and field circuits, a circuit opening device in said field circuit operative in response to abnormal conditions in said armature circuit, means operative as said device opens to dissipate the energy of the field circuit and surges transmitted thereto, and auxiliary energy dissipating means operative during the interval between the occurrence of the abnormal condition and the opening of said device.

6. In combination, a dynamo electric machine having armature and field circuits, means operative in response to abnormal conditions in said armature circuit for causing a rapid rate of decrease of the magnetic flux of said field without damaging the insulation thereof, and means for removing the effect of said means to cause a rapid rate of increase of said flux when conditions on said armature circuit become normal.

7. In combination, a dynamo electric machine having armature and field circuits, of means operating in response to abnormal conditions for dissipating the surges appearing in said field circuit and absorbing the energy therein, and means for eliminating the effect of said first mentioned means on said field circuit when said abnormal conditions disappear.

8. In combination, a dynamo electric machine having armature and field circuits, of means operative in response to abnormal conditions for dissipating the surges appearing in said field circuit and absorbing the energy stored therein, and means for short-circuiting said first mentioned means during the restoration of the field circuit when normal conditions are restored.

9. In combination, a dynamo electric machine having armature and field circuits, of an energy absorbing means for said field circuit operative in response to abnormal conditions therein, a second energy absorbing means normally inoperative but rendered operative to absorb the energy of said field circuit in response to abnormal conditions in said armature circuit, and means for rendering both said energy absorbing means inoperative during the return of said field circuit to normal condition.

10. In combination, a dynamo electric machine having armature and field circuits, energy absorbing means connected in said field circuit, a resistance normally short circuited, means for opening said short circuit, and means in operative relation with said opening means for eliminating said energy absorbing means.

11. In combination, a dynamo electric machine having a field circuit, a reactance connected in series with the circuit, and a resistance connected in shunt to the reactance.

12. In combination, a dynamo electric machine having armature and field circuits, a reactance and a resistance in series with the field circuit, said resistance being normally short circuited, and means for opening said short circuit when the current in the armature circuit exceeds a predetermined amount.

13. In combination, a dynamo electric machine having armature and field circuits, a reactance and a resistance in series with the field circuit, the resistance being normally short circuited, means for opening said short circuit when the current in the armature circuit exceeds a predetermined amount, and means connected in shunt to the field circuit for absorbing the energy stored in the field circuit and transmitted thereto by abnormal conditions occurring in the armature circuit.

14. In combination, a dynamo electric machine having armature and field circuits, a resistance in said field circuit, a circuit opening device normally shunting said resistance and automatically opened in response to abnormal conditions in said armature circuit, and means including resistance and reactance in said field circuit operative to dissipate the energy of the field circuit and surges transmitted thereto during the interval between the occurrence of the abnormal condition and the opening of said circuit opening device.

15. In combination, a dynamo electric machine having a field winding divided into a plurality of portions, auxiliary circuits connected across such portions, a reactance connected in series with the winding, and a resistance connected in shunt to the reactance.

16. In combination, a dynamo electric machine having a field winding divided into a plurality of portions, auxiliary circuits including resistance connected across said portions, a reactance connected in series with the winding, a resistance connected in shunt to the reactance, a second resistance connected in series with the winding normally short circuited, and means for opening the short circuit in response to abnormal electrical conditions occurring in the armature circuit.

17. In combination with a dynamo electric machine having an armature circuit, of a field winding divided into sections, an exciting circuit therefor, means responsive to a predetermined potential difference across each section for dissipating the energy stored in that section, and means in the exciting circuit operative in response to abnormal conditions for raising the potential across said sections to said predetermined amount.

18. In combination, a dynamo electric machine having a field winding divided into a plurality of portions, means for absorbing energy connected across said portions, an exciter connected to the winding, a reactance connected in series with the winding, and an electric valve connected in shunt to the exciter.

In witness whereof, I have hereunto set my hand this 9th day of November, 1914.

ELMER E. F. CREIGHTON.

Witnesses:
ELIZABETH F. PECK,
HELEN ORFORD.